Jan. 11, 1955        C. E. WELLER        2,699,195
APPARATUS FOR WINDING TRANSFORMER CORES
Original Filed April 5, 1951        9 Sheets—Sheet 1

INVENTOR
Carl E. Weller
BY Mason, Fenwick & Lawrence
ATTORNEYS

Jan. 11, 1955 C. E. WELLER 2,699,195
APPARATUS FOR WINDING TRANSFORMER CORES
Original Filed April 5, 1951 9 Sheets-Sheet 8

Fig. 11

INVENTOR
Carl E. Weller
BY
Mason, Fenwick & Lawrence
ATTORNEYS

Jan. 11, 1955          C. E. WELLER          2,699,195
APPARATUS FOR WINDING TRANSFORMER CORES Original Filed April 5, 1951          9 Sheets-Sheet 9

INVENTOR
*Carl E. Weller*

BY *Mason, Fenwick & Lawrence*
ATTORNEYS

United States Patent Office 2,699,195
Patented Jan. 11, 1955

2,699,195

APPARATUS FOR WINDING TRANSFORMER CORES

Carl E. Weller, Easton, Pa., assignor to Weller Manufacturing Company, Inc., Bayamon, P. R., a corporation of Puerto Rico Original application April 5, 1951, Serial No. 219,415. Divided and this application April 23, 1952, Serial No. 283,877

3 Claims. (Cl. 153—64)

The present invention relates in general to the production of induction apparatus, and more specifically to apparatus for applying magnetic strip material to electrical conductive windings to form hollow cylindrical transformer cores.

This application is a division of my copending application Serial Number 219,415, filed April 5, 1951.

Conventionally, magnetic cores of transformers are constructed in rectangular laminated form from metallic strips, with the primary and secondary windings separately wound about opposite legs of the rectangular core. Metallic cores are also constructed in the form of a rectangular hollow frame with an intermediate leg, the primary winding being wound about the intermediate leg through the hollow portions to either side thereof, and the secondary winding wound around and insulated from the primary winding.

Recently, cores have been wound of silicon steel strips, which are coiled into a spirally laminated hollow cylindrical form about legs of form wound conductive windings. The method employed to form such coiled transformer cores of strip material has been to roll the silicon steel strip of magnetic core material off of a stock roll for a length suitable to form the transformer core, and wind this length into a compact hollow cylinder having an inside diameter approximately equal to the outside diameter of the leg of the insulated electrical winding to which the core is to be applied. In some instances the strip material is wound upon an arbor and the outer end of the strip is secured to the underlying layer of strip material by means of spot welds or other fastening means. The coil of magnetic strip material so wound is then placed in a furnace and is subjected to heat treatment to give it a permanent set.

After the coil is cooled following heat treatment, it is unwound and rewound into a larger coil of an inside diameter greater than the total width of the electrical winding to which the core is to be applied, the outer end of the large loop being preferably spot welded or otherwise secured to the underlying layer to maintain the diameter of the loop during the unwinding process.

To apply the magnetic strip material to a conductive winding, the large loop is positioned so as to entirely surround the conductive winding, with the axis of the loop parallel to the winding leg to which the loop is to be applied. The end of the inner layer of the strip material forming the large loop is then led through the window of the winding and is coiled around the leg of the winding to form a small loop. The tip end of the strip is secured to the adjacent layer of the loop to approximate the diameter or thickness of the winding leg. The large loop is then rotated in such a direction as to cause the material on the inside of the loop to be fed progressively onto the outside of the smaller loop to build up a rotating coil of strip material of continuously increasing diameter until all of the strip material has been fed on the coil surrounding the winding leg.

Variations of this method have been effected by unwinding the compact cylindrical coil, which has been heat treated, into a larger loop extending through the window of the form wound transformer winding and around the smaller coil, the smaller coil being unwound entirely into the larger loop and then allowed to collapse onto the leg of the transformer winding.

This method of forming spirally wound transformer cores of strip material has been found to be quite expensive and time consuming, because of the number of separate operations required to draw the strip material from the stock roll in proper lengths to form the small loop and spot weld the ends thereof, induce the necessary permanent set by heat treatment into the small loop, rearranged the compact heat treated loop into a larger diameter loop, unwind the large diameter loop into a small diameter loop about the leg of the transformer winding, and then tighten the turns of the loop formed about the winding leg into a compact coil.

An object of the present invention, therefore, is the provision of a novel apparatus for window hollow cylindrical transformer cores of magnetic strip material which largely obviates the necessity for conditioning the magnetic strip material and producing the wound coil about a transformer winding leg in separate stages as heretofore required.

Another object of the present invention is the provision of novel means for forming a spirally laminated transformer core from magnetic strip material drawn directly from a stock roll of the strip material.

Another object of the present invention is the provision of a novel means for forming spirally wound, hollow cylindrical transformer cores from magnetic strip material in which the necessary curved set is formed in the strip material drawn directly from a stock roll and immediately fed about a leg of a transformer winding in accurately metered lengths.

Another object of the present invention is the provision of a novel apparatus for forming a hollow cylindrical transformer core of magnetic strip material in the production of a transformer assemblage wherein all components thereof are rigidly held in proper relative position by torsional grip derived from the core.

Other objects, advantages and capabilities of the present invention will become apparent from the following detailed description taken in conjunction with the accompanying drawings, wherein only a preferred embodiment of the invention is illustrated.

The invention relates in general to means for forming a hollow cylindrical, spirally laminated transformer core from a narrow strip of silicon steel. Silicon steel strip material is unwound from a stock roll and impressed with a transverse score and a limit slot at spaced points defining lengths appropriate to form a single hollow cylindrical transformer core. The steel strip is guided about a radius to strain the material beyond its elastic limit and thereby impart an arcuate set to the strip proportioned to the diameter of the legs of a transformer winding. The strip material thus set is projected along an arcuate path from the radius through the window and about the leg of the form wound conductive winding, and the portion of the strip material coiled about the transformer winding is separated from the strip coupled from the stock roll by bending the strip along the score line impressed therein. A leg of U-shaped conductive secondary element is inserted through the hollow of the wound transformer core, and the core is tightened about the legs of the primary and secondary elements to torsionally grip the same in fixed, accurately located relation. To this end a plurality of units have been particularly designed to effect the winding of the strip material onto the primary winding, and to tighten the spirally wound hollow cylindrical core about the primary and secondary conductive units, these two mechanisms being hereinafter referred to as the core winding unit and the core tightening unit, respectively.

Figure 1:
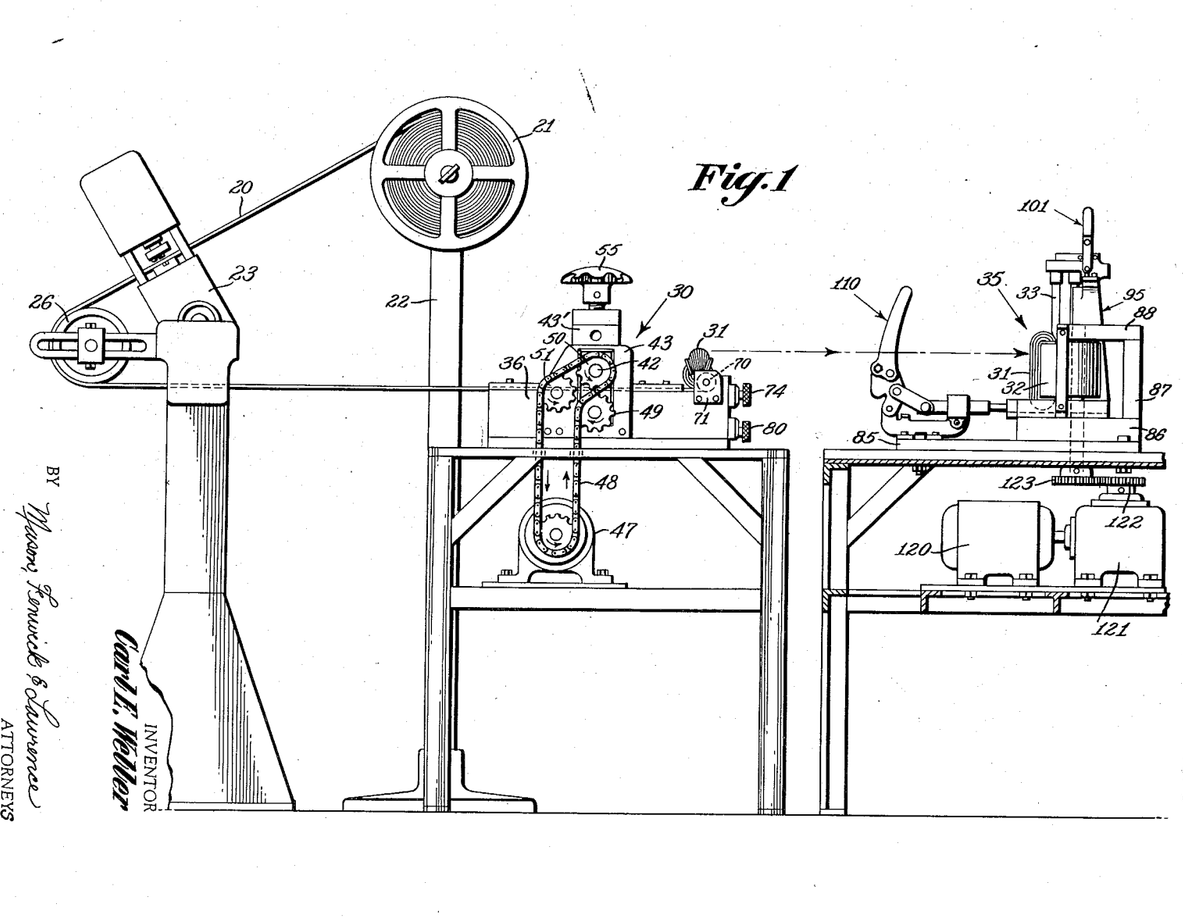
Figure 1 is a side elevation indicating schematically an arrangement of mechanisms suitable for forming a transformer assemblage in accordance with the present invention.

The various mechanisms for winding the silicon steel strip material continuously and directly from the stock roll on to a leg of the preformed primary conductive winding are illustrated generally in Figure 1 of the accompanying drawings, like reference characters indicating corresponding parts throughout the several figures of the drawings.

Referring particularly to Figure 1, the silicon steel strip material of a commercially available type, indicated by the reference character 20, is arranged on a stock reel 21 journaled on a suitable upright support 22. The steel strip material 20 is coupled through a conventional power punch press 23, wherein a transverse score 24 and edge notches 24', and a limit slot 25 disposed immediately rearwardly of the transverse score and along the medial axis of the strip 20, are punched in the silicon steel. The punch press may be of the electrically actuated type operated from a remote station.

The strip material 20 is thence coupled about a suitable idler pulley 26 mounted on the supporting frame for the punch press 23, and to the core winding unit, generally indicated by the reference character 30. This arrangement is provided to permit adjustment of the length of strip material between scores and to conserve space. The core winding unit 30 is adapted to shape the normally straight steel strip 20 into an arc or small radius by bending the same along a radius sufficiently small to impose an elastic strain in the steel strip 20 and form an arcuate set therein. Means are provided for positioning a primary conductive winding 31 for the transformer immediately above the place where the curved set is imparted to the strip 20 to feed the curved leading edge of the strip through the window of the primary winding and cause the steel strip to coil about itself and form a hollow cylindrical, spirally laminated transformer core, this being illustrated in Figure 3.

Figure 2:
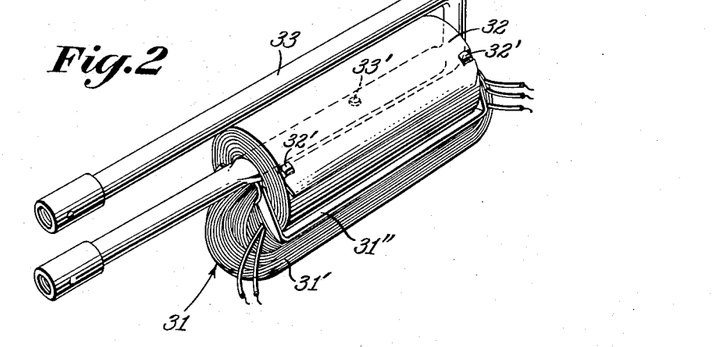
Figure 2 is a perspective view of the transformer assembly produced by the instant apparatus.
Figures 5, 14:
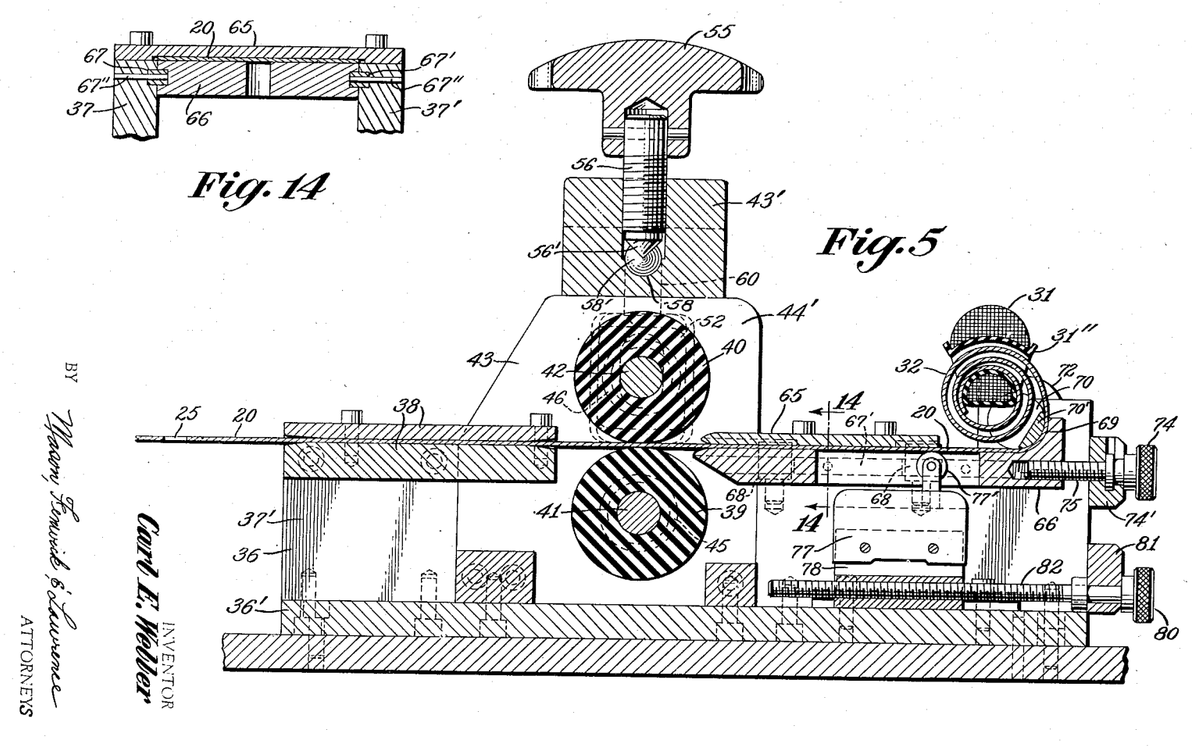
Figure 5 is a vertical longitudinal section of the core winding unit, taken along the line 5—5 of Figure 4.
Figure 14 is a vertical transverse section detail of the strip material guide for the core winding unit, taken along the lines 14—14 of Figure 5.

The primary winding 31 comprises a plurality of loops of a suitable electrical conductor 31' wound about a form 31" of cardboard or other suitable material. The metallic strip material 20 is adapted to be wound through the hollow center or window of the primary winding 31 to form a spirally laminated hollow cylindrical core indicated at 32 in Figure 2, the core 32 being initially in the form of relatively loose spirals immediately after it is fed out of the core winding unit 30, as shown in Figure 5. A leg of a U-shaped secondary element, indicated at 33 in Figure 2, is projected through the hollow of the core 32 with a lug 33' disposed within the hollow of the core 32 in registry with the limit slot 25 of the strip material 20. To produce the finished transformer unit, this assemblage is disposed in the core tightening unit 35, illustrated in Figure 1, and the outer turns of the hollow cylindrical core 32 are frictionally driven about the inner turn to tighten the core and torsionally grip the legs of the primary and secondary elements 31 and 33 within the hollow of the core to form a rigid transformer assembly.

Figure 3:
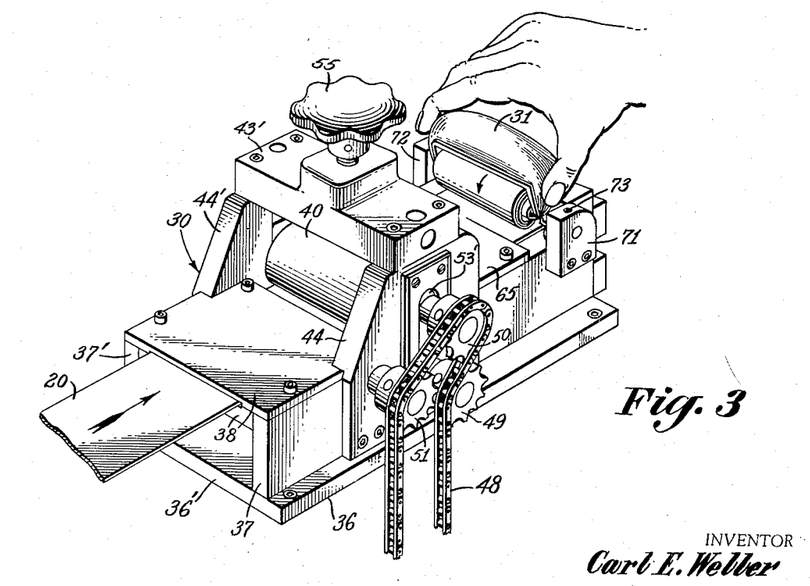
Figure 3 is a perspective view of the transformer core winding unit illustrating the manner in which the conductive winding is associated therewith to wind the core about a leg of the winding.
Figure 4:
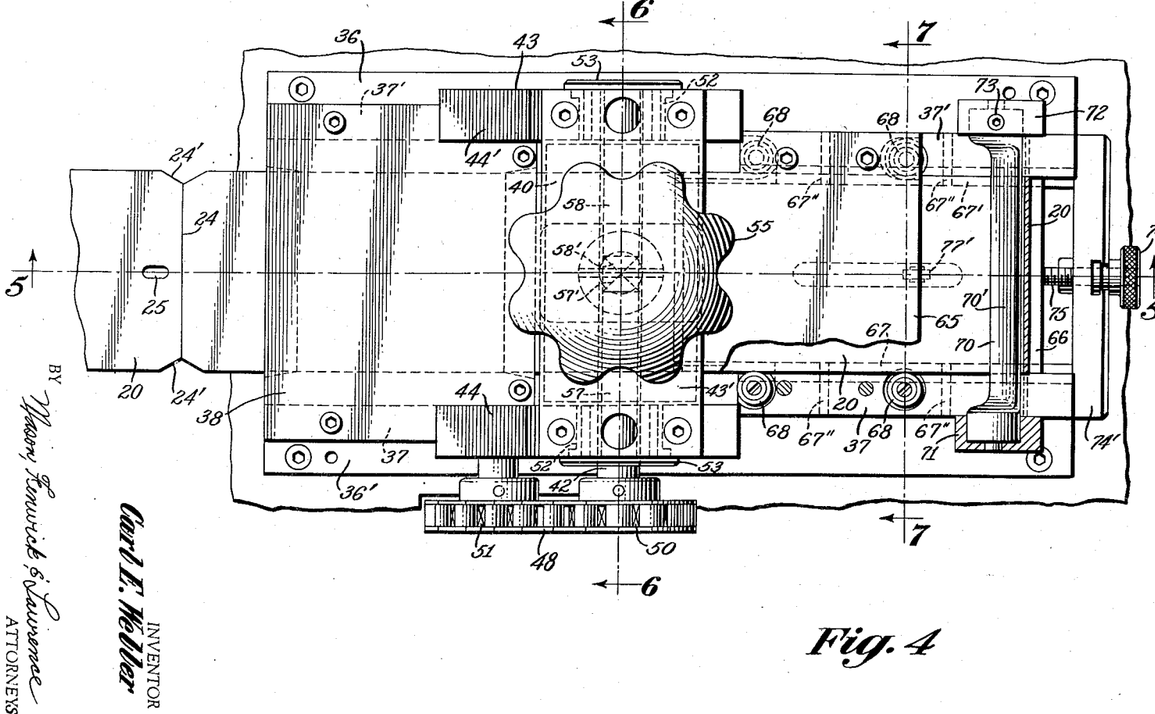
Figure 4 is a plan view of the machine constituting the transformer core winding unit.
Figures 6, 7, 8:
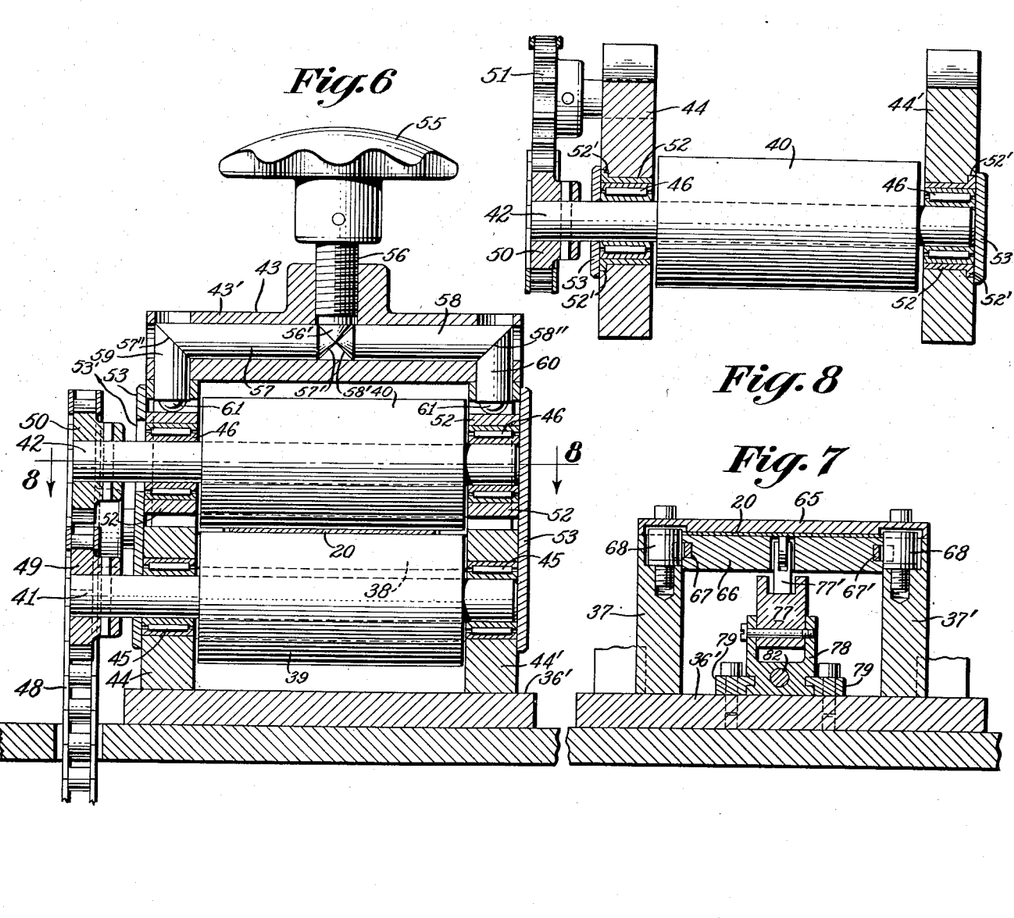
Figure 6 is a vertical transverse section through the traction roll journaling yoke forming a part of the core winding unit, taken along the line 6—6 of Figure 4.
Figure 7 is a vertical transverse section through a portion of the core winding unit, illustrating the manner in which the strip of magnetic material is guided therethrough, taken along the line 7—7 of Figure 4.
Figure 8 is a horizontal section through a portion of the traction roll yoke, taken along the line 8—8 of Figure 6.
Figure 9:
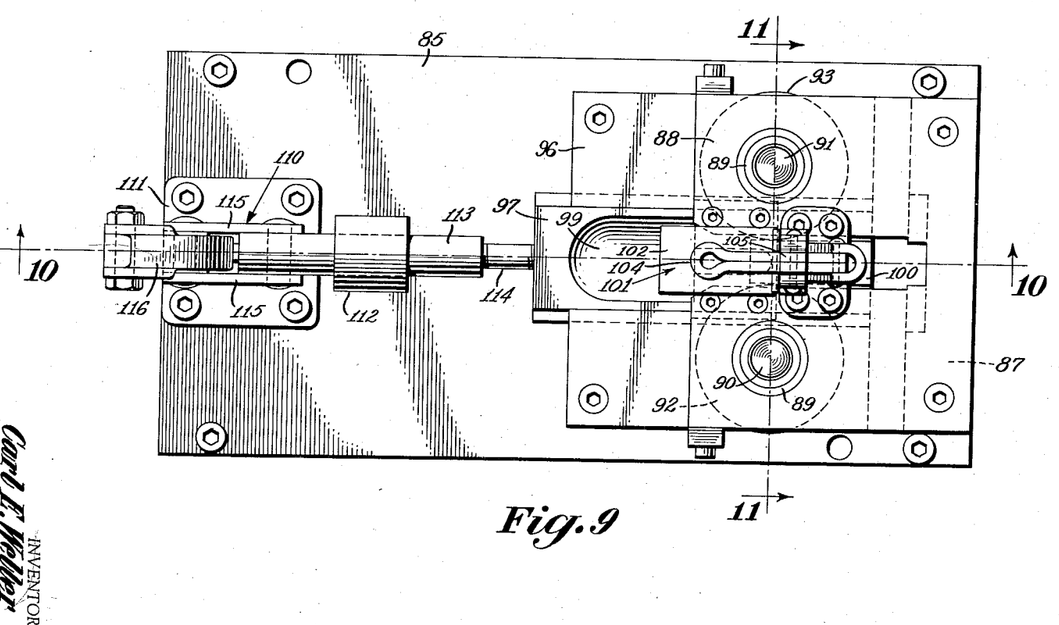
Figure 9 is a top plan view of the core tightening unit.

The core winding unit, specific reference being had to Figures 3 and 8, inclusive, and 14, comprises an elongated housing, generally indicated at 36, of U-shaped upwardly opening cross section having a base 36' and a pair of opposed sides 37, 37'. A pair of guide plates 38 defining a horizontal guideway are mounted between the upper edges of the sides 37, 37' at the end disposed toward the punch press 23, through which the strip material 20 is drawn by a pair of transversely disposed traction rolls 39 and 40. The traction rolls are provided with transversely disposed shafts 41, 42, respectively, journaled in a yoke 43 having a transverse arm 43' and downwardly depending legs 44, 44', the shaft 41 being journaled in bearings 45 and the shaft 42 in bearings 46 each arranged in the depending legs 44, 44' of the yoke.

Means are provided for driving the traction rolls 39 and 40 to draw the strip material 20 from the stock reel 21 and about the pulley 26, comprising an electric motor 47 having a sprocket chain 48 driven from the shaft thereof. A pair of sprockets 49 and 50 are provided on the ends of the shafts 41 and 42, respectively, and an idler sprocket 51 is journaled on the yoke leg 44. The sprocket chain 48 extends upwardly from the motor 47, about an upwardly extending segment of the sprocket 49, around the sprocket 50, and about a segment of the idler sprocket 51 disposed away from the sprocket 49. The sprocket chain 47 thus drives the sprockets 49 and 50 and their corresponding rolls 39 and 40 in opposite directions, the roll 39 being driven in a clockwise direction as viewed in Figure 5.

The traction rolls 39 and 40 are formed of tubular bodies of rubber or other resilient material providing a close frictional engagement between the rolls and the strip 20 to facilitate drawing the strip from the stock reel 21.

Means are provided for adjusting the tension of the upper roll 40 relative to the lower roll 39. The bearings 46 in the depending legs 44, 44' of the yoke 43 are mounted for vertical sliding movement within the depending legs 44, 44' by means of a sliding block 52 disposed in each leg having flanges 52' extending into complementary grooves in the depending legs 44, 44'. A vertical slot 53' is provided in the capping plate 53 through which the shaft 42 extends to accommodate vertical movement thereof.

The means for manually adjusting the tension on the upper roll 40 comprises a manual control knob 55 keyed to a threaded screw 56 extending through the transverse arm 43' of the yoke 43 and terminating in a tapered point 56' internally of the transverse arm. A pair of transversely arranged pressure equalizing bars 57, 58 are likewise provided with conically tapered ends 57', 58' in engagement with the tapered point 56', the equalizing bars 57, 58 being adapted to be simultaneously urged outwardly by the camming interaction of the conical surfaces 56', 57' and 58' on rotation of the screw 56 into the transverse arm 43'. Beveled surfaces 57", 58" are provided at the outer ends of the equalizing bars 57 and 58 to engage complementary beveled surfaces on vertically extending equalizer bars 59 and 60, the lower end of the equalizer bars having bearing elements 61 engaging the blocks 52 supporting the bearings 46 for the shaft 42 and roll 40. Thus, adjustment of the tension between the traction rolls 40 and 39 can be effected by manipulation of the manual control knob 55, rotation of the knob in a clockwise direction as viewed in Figure 4 effecting a progressively further insertion of the screw 56 into the transverse arm 43' of the yoke 43 to cam the equalizer bars 57, 58 laterally and the bars 59 and 60 downwardly to increase the pressure which the upper roll 40 asserts against the roll 39. On release of the tensioning pressure, the roll 40 will be urged upwardly to return the equalizer bars to normal position by the inherent resiliency of the rubber body of the rolls.

The means for imparting a curved set to the strip material 20 is disposed on the opposite side of the rolls from the guide plates 38, and comprises an upper fixed guide plate 65 and a lower movable die plate 66. The die plate 66 is supported by keys 67, 67' mounted in the sides 37, 37' by means of press fitted dowel pins 67". Each of the keys extend into complementary grooves in the edges of the die plate 66 to permit longitudinal adjustment of the plate 66. The keys 67, 67' are each provided with a curved recess midway of the length thereof to accommodate rolls 68 journaled on vertical axes in the sides 37, 37' and projecting into the guideway defined between the plates 65 and 66 to engage and locate the sides of the strip material 20.

One end of the adjustable die plate 66 is shaped to form a cylindrical die surface or radius 69 to cooperate with an adjustable radius bar 70 in defining a curved guideway for the strip material 20 having a radius of curvature sufficiently small to strain the strip 20 beyond its elastic limit and impart a permanent curved set thereto. The adjustable radius bar 70 is formed only of a cylindrical segment 70' intermediate the ends thereof to provide a cut out portion to accommodate the curved turns of the strip 20 on the winding 31 and is journaled in supporting blocks 71, 72 secured to the sides 37 and 37' of the housing 36. Set screws 73 are mounted in the top of the supporting blocks 71, 72 to retain the segment 70' in its manually adjusted angular position relative to the die surface 69 of the die plate 66.

Adjustment of the radius of the arcuate set imparted to the strip material 20 is determined by the position of the adjustable die plate 66 and therefore the proximity of the die surface 69 to the radius bar 70. To this end, a manual knob 74 is journaled in a transverse member 74' secured to the sides 37, 37' of the housing and is provided with a threaded screw 75 extending into a complementary threaded aperture in the plate 66 to effect sliding movement of the plate 66 along the keys 67, 67' and adjust the position of the same relative to the radius bar 70.

The cut out portion of the radius bar 70, and the supporting blocks 71, 72, are arranged to accommodate the primary winding 31 in the relation indicated in Figure 3 of the drawing. Opposite portions of the conductive winding rest on the upper inwardly disposed edges of the supporting blocks 71, 72, with the window of the primary winding disposed above and spaced slightly back from the die plate exit. The curved strip material 20 is projected upwardly through the window of the primary winding 31 and about itself, as illustrated in Figure 5, forming a hollow cylindrical transformer core about the lowermost leg of the primary winding 31.

A micrometer switch 77 is disposed within the housing 36 below the adjustable die plate 66, the switch arm 77' extending upwardly through a longitudinal slot formed in the die plate 66 to engage the strip material 20 along the medial axis thereof. The micrometer switch 77 is carried by a yoke 78 supported for longitudinal sliding movement by a pair of guides 79 mounted on the base 36'. A manual control knob 80 is journaled in a transverse member 81 mounted to the sides 37, 37' of the housing, and is provided with a threaded screw 82 extending through a complementary threaded aperture in the yoke 78 to adjust the position of the micrometer switch 77. The micrometer switch may be electrically intercoupled with suitable contact means in the supply circuit to the electric motor 47 driving the traction rolls 39 and 40, to open the contact means and deenergize the motor supply circuit when the arm 77' registers with the limit slot 25 in the strip 20, and permit the traction rolls 39, 40 to coast to a stop. The position of the micrometer switch 77 in the housing 36 is adjusted by means of the threaded screw 82 and control knob 80 to position the arm 77' relative to the radius rod 70 so that when the traction rolls coast to a stop the transverse score 24 impressed in the strip material is exposed immediately above the die plate exit. In this manner the traction rolls are automatically stopped when the appropriate length of strip material to form a single transformer has been drawn from the reel and fed through the curved guideway between the die 69 and radius bar 70, so that the wound core and the winding 31 can be bent back and forth to break the strip 20 along the score 24.

After a suitable length of the strip material 20 has been wound loosely about a leg of the primary winding 31 and the strip is broken off along the transverse score 24 to form the hollow cylindrical core 32, a leg of the U-shaped transformer secondary conductive element 33 is inserted through the hollow of the core 32 with the stopping lug 33' on the element 33 in registry with the limit slot 25 of the strip 20. The core is then in condition to be tightened about the legs of the primary and secondary conductive elements 31 and 33 to form a tightly wound hollow core torsionally gripping the primary and secondary elements to maintain the unit in a rigid assembly. This means is illustrated in detail in Figures 9 to 13, inclusive, of this unit, generally indicated at 35 in Figure 1, and comprises a base 85 having a stand thereon comprising lower horizontal plate 86, a vertical back plate 87, and an upper horizontal yoke plate 88. Each of the horizontal plates 86 and 88 support suitable bearings 89, in which shafts 90 and 91 having rubber friction rolls 92 and 93, respectively, are journaled. The friction rolls 92 and 93, respectively, are aligned transversely and are spaced symmetrically to either side of the longitudinal medial axis of the unit 35. A clamp assembly, indicated generally by the reference character 95, is mounted on the lower plate 86, and is adapted to rigidly clamp the opposite ends of the transformer secondary element 33 in a position to draw the loosely wound core 32 against the surface of each of the friction rolls 92, 93, and to this end is provided with a lower horizontally disposed base 96 having a grooved recess formed therein to slidably receive a slidable socket member 97 therein, the socket member being provided with recesses 98 and 99 in the upper surface thereof. The recess 98 is adapted to snugly accommodate the bent end of the U-shaped transformer secondary element 33 and the recess 99 is adapted to loosely accommodate an end of the primary winding 31. An upright standard 100 forming part of the clamp 95 extends upwardly from the socket member 97 between the arms of the yoke 88 for substantially the length of one of the transformer secondary elements 33. An overthrow clamping mechanism generally indicated at 101 is provided at the top thereof and illustrated in detail in Figure 13.

This overthrow clamping mechanism comprises a socket plate 102 provided with sockets 103, 103' to receive the free ends of the legs of the secondary element 33, and is welded or otherwise suitably secured to a lever 104 pivotally coupled to the rear standard 100. An operating lever 105 of bifurcated form is pivoted to the standard 100 below and forward of the pivoted coupling of the arm 104 and a depending link 106 is intercoupled between the operating lever 105 and the pivoted arm 104 in alignment with the lever 105 when it is disposed vertically. Pivotal stop pin 104' is provided on the pivoted arm 104 to limit forward rotation of the control lever 105.

Figure 13:
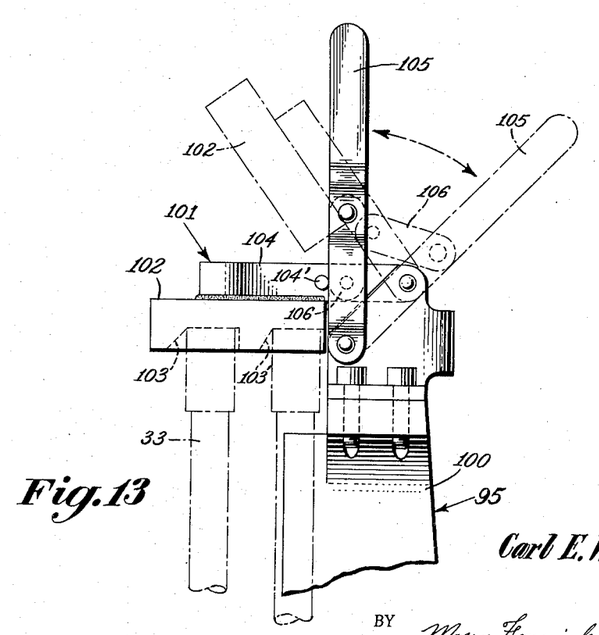
Figure 13 is a detail elevation of the transformer clamp mounted on the core tightening unit.

On rotation of the control lever 105 in a clockwise direction as viewed in Figure 13 from a vertical position, the lever arm 104 and socket plate 102 are rotated upwardly to the dotted line position, to free the legs of the transformer secondary element 33 to permit removal of the same. On rotation of the control lever 105 to the vertical position, the pivoted arm 104 and socket plate 102 are again rotated downwardly to dispose the upper ends of the element 33 in the sockets 103 and 103' and seat the bent end of the element 33 in the recess 98 in the socket member 97. As the operating lever 105 and link 106 are aligned vertically when the lever 105 is rotated forwardly into abutment with the stop pin 104', the secondary element 33 is rigidly held against displacement until the lever is moved out of this position.

Means are provided for urging the transformer assembly rearwardly into intimate frictional engagement with the friction rolls 92 and 93, comprising a clamp generally indicated at 110 mounted on a U-shaped bracket 111 secured to the base 85, and having an arm 112 provided with a sliding bearing 112' to receive a sliding link 113 adjustably intercoupled with the socket member 97 by means of a threaded stud 114. The sliding link 113 is pivotally intercoupled by means of a link 115 with a lever 116 pivoted at 117 to the U-shaped bracket 111. The lever 116 is of the overthrow type adapted to be rotated in a clockwise direction as viewed in Figure 10 to urge the socket member 97 in the direction of the friction rolls and clamp the transformer intimately against the rolls, the pivotal coupling of the link 115 with the lever 116 being disposed below the pivot 117 and sliding link 113 when the lever is in lowermost clamping position to maintain the socket member 97 in its inwardly extending position until the lever 116 is manually rotated counterclockwise.

Suitable drive means are provided for the friction rolls 92 and 93 comprising an electric motor 120 intercoupled through a reduction gear box 121 and gear 122, with gears 123 and 124 on the lower end of the shafts 90 and 91, respectively, the gears 123 and 124 being independent of each other but each intermeshed with the drive gear 122.

When the friction rolls 92 and 93 have been driven for a sufficient period to wind the loosely wound core 32 tightly, through the frictional engagement of the rolls 92 and 93 with the outer surface of the transformer core 32, the motor 120 is deenergized, but the clamps 110 and 101 are maintained in position clamping the transformer unit against the rolls while a crimping spike is manually driven against the edges of the outer several turns of the core 32 adjacent the outer end of the strip material to form crimps 32' in the core and maintain it in tightly wound condition.

To summarize the operations of the mechanisms above described in performance of the process producing the cylindrical transformer cores from strip material, assuming that the leading edge of the strip material 20 is exposed immediately above the exit of the die plate 66, the power press 23 is energized to impress the transverse score 24 and limit slot 25 in the strip material 20. The pulley 26 is adjusted to provide a path for the strip material from the power press 23 to the exit of the die plate 66 of a length equal to that required forming one transformer core 32. The motor 47 driving the traction rolls 39 and 40 is then energized, drawing the strip material 20 from the reel 21 and feeding the same through the curved guideway defined between the die plate 66 and radius bar 70, to strain the strip beyond its elastic limit and impose a curved set therein determined by the spacing between the cylindrical segment 70' of the radius bar 70 and the die plate 66.

The transformer primary 31 is manually held against the upper edges of the journal blocks 71 and 72 for the radius bar with the window of the winding 31 being positioned to receive the curved leading edge of the strip material 20 as it emerges from the exit of the die plate 66. Continuous driving of the traction rolls 39 and 40, therefore, feeds the curved strip material 20 through the opening of the transformer winding 31 to wind the strip material about itself and a leg of the winding. When the limit slot 25 registers with the contact arm 77' of the limit switch 77, the supply circuit to the motor 47 is deenergized, permitting the traction rolls 39, 40 to coast to a stop such that the transverse score 24 in the strip material is exposed immediately above the exit of the die plate 66. The transformer primary winding 31 and loosely wound core 32 are then manually oscillated back and forth to sever the strip 20 along the transverse score.

Figure 10:
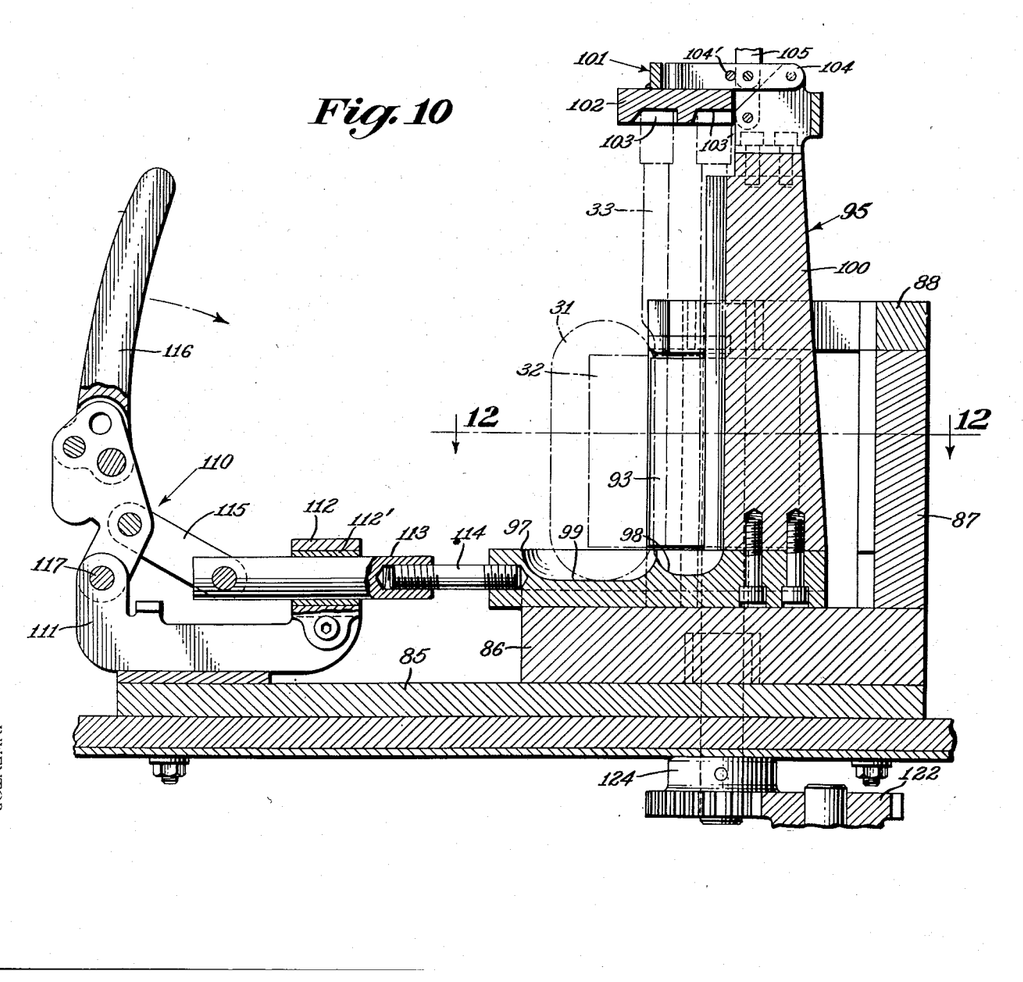
Figure 10 is a vertical longitudinal section of the core tightening unit, taken along the line 10—10 of Figure 9.
Figure 11:
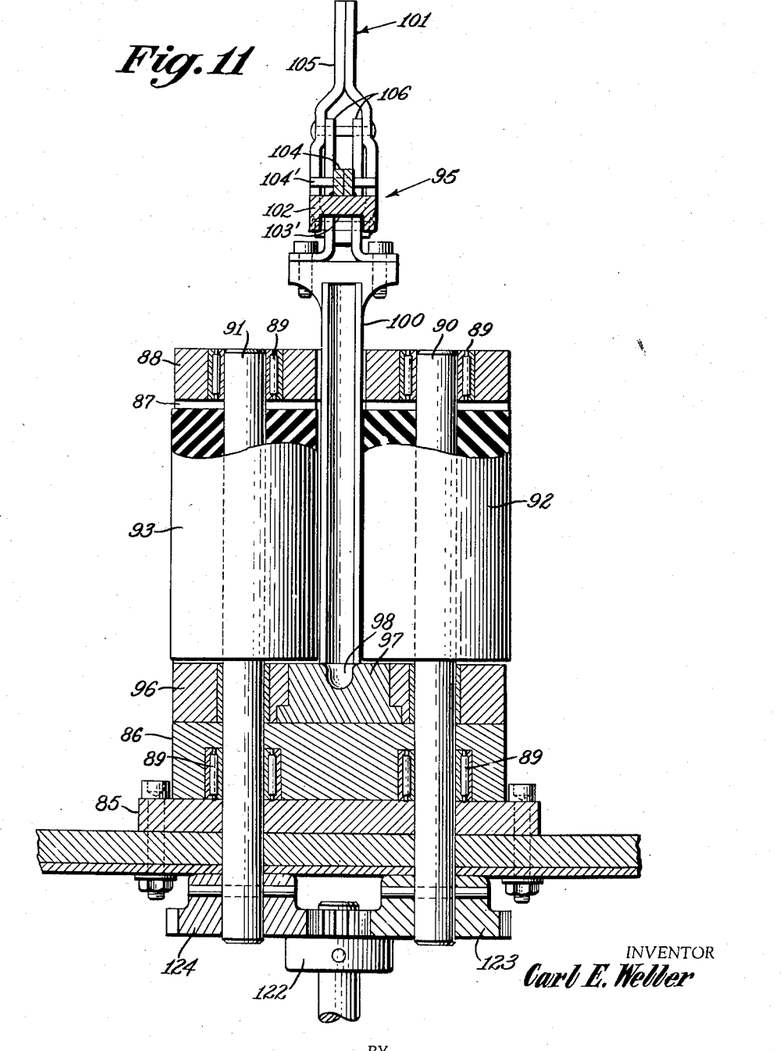
Figure 11 is a vertical transverse section of the core tightening unit taken along the line 11—11 of Figure 9.
Figure 12:
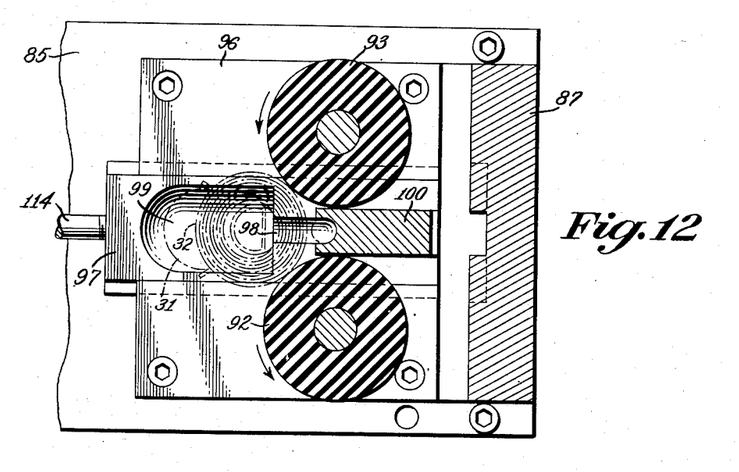
Figure 12 is a horizontal section through the core tightening rolls of the core tightening unit, taken along the line 12—12 of Figure 10.

A leg of the U-shaped secondary 33 is then inserted through the hollow of the loosely wound core 32 with the lug 33, thereon in registry with the limit slot 25 in the strip 20. With the operating lever 105 of the overthrow clamping mechanism 101 rotated to the position shown in dotted lines in Figure 13, and the lever 116 of the clamp 110 positioned as shown in Figure 10, the transformer assembly is positioned in the clamp assembly 95 with the bend of the secondary element 33 nested in the recess 98 in the socket member 97. The operating lever 105 is then rotated to a vertical position clamping the free ends of the secondary element 33 in the sockets 103, 103' of the socket plate 102, and the lever 116 of the clamp 110 is rotated in a clockwise direction as viewed in Figure 10 to a horizontal position, urging the socket member 97 in the direction of the friction rolls 92, 93 and clamping the loosely wound core 32 in frictional engagement with the friction rolls. The drive motor 120 for the friction rolls 92, 93 is then energized for a sufficient period to wind the turns of the core 32 tightly about the innermost turn thereof, the inner turn being held stationary by the lug 33' registering in the slot 25, and while the transformer assembly is still clamped in the core tightening unit 35, a suitable crimping tool is driven against the ends of the core 32 to form crimps 32' therein and hold the core in tightly wound position.

It will be apparent from the foregoing description that novel apparatus has been devised by which silicon steel strip material can be unwound from a stock reel, conditioned continuously as the strip material is unwound to impart a suitable curved set therein, and the conditioned strip continuously wound on a leg of a form wound transformer winding to provide a hollow cylindrical, spirally laminated core of strip material. This core of strip material, although loosely wound, can be conveniently tightened by rotating the outer turns thereof relative to the innermost turn, and when tightened, may be crimped, spot welded or otherwise secured in tightened condition with the primary and secondary elements of the transformer securely held in proper relation by the torsional grip of the turns on the portion nested within the hollow of the transformer core.

While but one embodiment of this invention has been particularly shown and described, it is distinctly understood that the invention is not limited thereto, but that various modifications may be made without departing from the spirit and scope thereof and it is desired that only such limitations may be placed thereon as are imposed by the prior art and are set forth in the appended claims.

What is claimed is:

1. A machine for forming a hollow cylindrical transformer core from magnetic strip material about a leg of a conductive loop winding comprising an elongated supporting frame, means for feeding preselected lengths of strip material through said frame, die means supported by said frame and positioned to receive strip material advanced by said feeding means, said die means comprising a juxtaposed radius bar and die plate defining a guideway therebetween and having adjacent cylindrically curved surfaces of radii to strain strip material fed therebetween beyond its elastic limit during feeding movement thereof and impart a preselected cylindrical curved set thereto and to support the strip material curved thereby in projecting relation beyond the exit of said guideway free of contact with the machine, said radius bar having a cut-away portion through the major portion of its diameter and extending substantially the length of said bar, and a pair of transversely aligned upright members carried by said frame adjacent the opposite ends of said radius bar and laterally spaced to accommodate therebetween curved strip material projecting from said guideway, said upright members having locating surfaces for supporting the conductive loop winding therebetween in a transverse plane relative to the path of the curved strip material with the window of said winding intercepting the normal path of said curved strip material projecting from said guideway whereby the curved strip material is projected through the window of the conductive loop winding supported on said locating means and about the lowermost leg thereof through the cut-away portion of said radius bar in successive turns to define a hollow cylindrical core.

2. A machine for forming a hollow cylindrical transformer core from magnetic strip material about a leg of a conductive loop winding comprising an elongated supporting frame, means for feeding preselected lengths of strip material longitudinally through said frame, a pair of transversely aligned supporting members extending upright from said frame and spaced laterally to accommodate the strip material therebetween, said supporting members having locating surfaces thereon for supporting the loop winding in a vertical plane extending transversely of the axis of said frame, and die means supported by said frame and positioned to receive strip material advanced by said feeding means, said die means comprising a radius bar supported at its ends in said supporting members and a die plate carried by said frame, said radius bar and die plate being arranged transversely of said frame and having adjacent cylindrically curved surfaces defining an arcuate guideway and of radii to strain the strip material fed therebetween beyond its elastic limit during feeding movement thereof for imparting a cylindrically curved set thereto and to project the strip material curved thereby beyond the exit of said guideway and above said frame through the window of said loop winding to freely form a spiral wound core about the lowermost leg of said loop winding, and said radius bar having a cut-away portion through the major portion of its diameter and extending substantially the distance between said supporting members, said cut-away portion being disposed adjacent and immediately below the lowermost leg of said loop winding when said loop winding is supported on said locating surfaces whereby said cut-away portion accommodates the portions of the curved strip material disposed below the lowermost leg of said loop winding as said strip material is wound about said lowermost leg.

3. A machine for forming a hollow cylindrical transformer core from magnetic strip material about a leg of a conductive loop winding comprising an elongated supporting frame having spaced upright side walls, die means supported on said frame adjacent one end thereof comprising a die plate disposed transversely between said side walls and a substantially cylindrical radius bar disposed in juxtaposed relation to said die plate defining an arcuate guideway therebetween, a pair of transversely aligned supporting blocks mounted on said side walls and projecting above said side walls, means supporting said radius bar in said blocks, said radius bar and die plate having adjacent cylindrically curved surfaces of radii to strain strip material fed therebetween beyond its elastic limit during feeding movement thereof and impart a preselected cylindrically curved set thereto, first guide means carried by said frame adjacent the end thereof opposite said die means for receiving strip material and guiding the same through said frame, a pair of driven traction rolls transversely disposed in said frame and journaled in the side walls thereof for feeding strip material therebetween to said die means and between said radius bar and die plate, second guide means carried by said frame for guiding strip material from said traction rolls into said arcuate guideway, said radius bar having a cut-away portion through the major portion of its diameter and extending substantially between said supporting blocks, and said supporting blocks having locating surfaces thereon adjacent the exit of said guideway for supporting the conductive loop winding in a transverse vertical plane relative to said frame with the window of said loop winding intercepting the normal path of the curved strip material emerging from the exit of said guideway, the strip material curved by said die means being supported by said die means and projected beyond the exit of said guideway by said traction rolls to feed the same freely through the window of said loop winding and about the lowermost leg thereof through the cut-away portion of said radius bar in successive turns to define a hollow cylindrical core about said lowermost leg.

References Cited in the file of this patent

UNITED STATES PATENTS

| Number | Name | Date |
|---|---|---|
| 589,570 | Palmer | Sept. 7, 1897 |
| 1,054,132 | Miner | Feb. 25, 1913 |
| 1,321,139 | McClenathen | Nov. 11, 1919 |
| 1,719,250 | Walstrom | July 2, 1929 |
| 1,835,002 | Birckmeyer | Dec. 8, 1931 |
| 2,069,595 | Thomas | Feb. 2, 1937 |
| 2,107,217 | Salsman | Feb. 1, 1938 |
| 2,135,288 | Koenig | Nov. 1, 1938 |
| 2,160,589 | Granfield | May 30, 1939 |
| 2,245,180 | Boyajian | June 10, 1941 |
| 2,246,239 | Brand | June 17, 1941 |
| 2,444,463 | Nordquist | July 6, 1948 |
| 2,609,192 | Lermont | Sept. 2, 1952 |

FOREIGN PATENTS

| Number | Country | Date |
|---|---|---|
| 409,749 | Germany | Feb. 10, 1925 |
| 641,639 | Great Britain | Aug. 16, 1950 |